Figure 1:
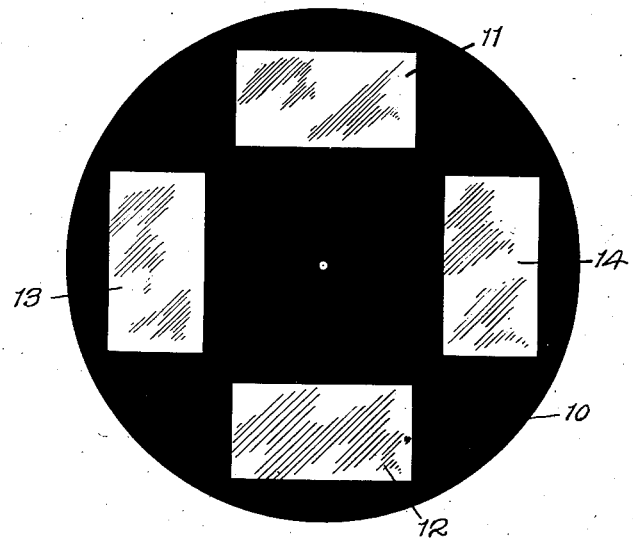

F. W. HOCHSTETTER.
COLOR FILTER FOR MOVING PICTURE MACHINES.
APPLICATION FILED MAY 25, 1916.

1,301,265.

Patented Apr. 22, 1919.

Inventor
Frederick W. Hochstetter.
By his Attorney
W. T. Criswell.

UNITED STATES PATENT OFFICE.

FREDERICK W. HOCHSTETTER, OF NEW YORK, N. Y., ASSIGNOR TO H. P. PATENTS AND PROCESSES COMPANY, INC., A CORPORATION OF NEW YORK.

COLOR-FILTER FOR MOVING-PICTURE MACHINES.

1,301,265.   Specification of Letters Patent.   Patented Apr. 22, 1919.

Application filed May 25, 1916. Serial No. 99,842.

*To all whom it may concern:*

Be it known that I, FREDERICK W. HOCHSTETTER, a citizen of New York, county and State of New York, have invented a certain new and useful Improvement in Color-Filters for Moving-Picture Machines, of which the following is a full, clear, and exact specification.

This invention relates to a class of devices adapted to be used in conjunction with moving picture machines.

My invention has for its object primarily to provide a color-filter designed to be utilized for photographing moving pictures of living objects, scenery, and the like whereby the natural color-values of the objects will be recorded on a sensitized film or plate, and the pictures after being developed may be exhibited in their natural colors by being projected on a screen. The invention consists essentially of an opaque body preferably in the form of a circular disk having a number of spaced transparent exposure areas disposed concentrically with relation to the center of the body, and each exposure area is composed of a plurality of color-divisions. When a series of animated pictures are photographed the filter is arranged between a sensitized film, or strip and the lens of a camera, and the filter is intermittently revolved across the optical axis of the lens simultaneously with the exposures of successive parts of the strip when also intermittently transmitted across the optical axis of the lens so that each exposure of the strip will be affected by the color-divisions of each consecutive exposure area. The negative thereby produced with the color-values recorded thereon is converted to a positive in the customary manner, and when the pictures are projected the color-filter is likewise intermittently revolved between the positive film and the screen on which the pictures are exhibited, the color-divisions of the exposure areas occupying positions relative to the positive they occupied when the negative was provided.

A further object of the invention is to provide a color filter employing more than one of the primary colors, applicant having discovered that each exposure must be affected by more than one of the primary colors in order to effectively produce moving pictures of objects in their natural colors and in order to equalize the persistency of vision. Furthermore, the recording of the color values on successive exposures of the film can be best done by a filter in which a plurality of exposure areas are provided, each having color divisions of at least two different colors, and the colors of one exposure area being different from those of the succeeding exposure area. By this arrangement, at least four different colors are provided, two in each exposure area, thus covering a much wider range than is possible with any two or three color combinations and serving to avoid the extreme amount of flicker which would ensue if only one color was used in each exposure area and if the colors of all exposure areas were the same.

A practical embodiment of the invention is represented in the accompanying drawing forming a part of this specification in which similar characters of reference indicate corresponding parts in all the views, the said invention being more fully described hereinafter, and then pointed out in the claims at the end of the description.

Figure 2:
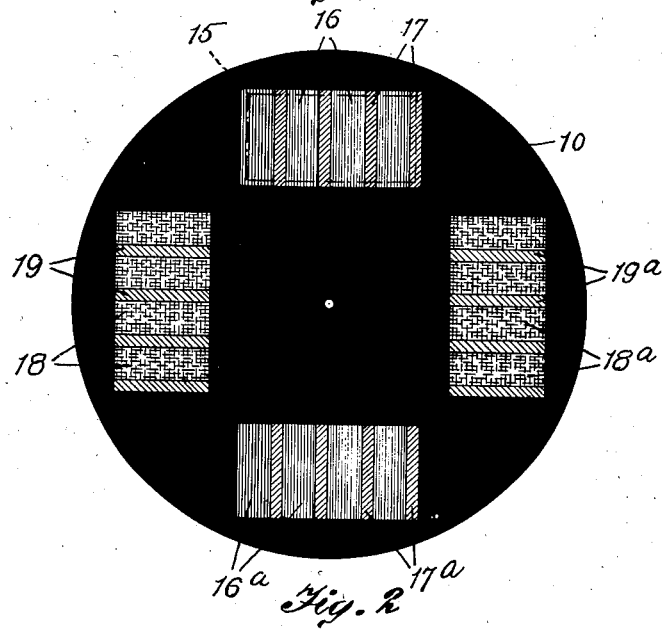

In the drawing, Figure 1 is a view of the body of one form of color-filter embodying my invention, and Fig. 2 is a view showing the filter when divided into color-divisions.

The color-filter is adapted in practice to be revolubly moved across the optical axis of a photographic lens and a projecting lens synchronously with the exposures of a moving picture film or strip, and this filter consists of an opaque body 10 and a plurality of transparent exposure areas 11, 12, 13, 14. The body 10 may be in the form of a circular disk, or other desired shape, and this body is preferably made of glass, or other transparent material which is coated with a layer of paint, or any suitable opaque material excepting the portions thereof which provide the transparent exposure areas, in order to prevent light passing through the body proper, though this body may be made of metal or other opaque material while the exposure areas are of transparent material arranged in openings therein. The exposure areas 11, 12, 13, 14 are disposed in spaced relation to each other as well as being disposed concentrically with respect to the center of the opaque body 10, and while I illustrate in the drawing four of the exposure areas forms of the filter may be made wherein a greater, or less number of the exposure areas are employed. Each of the exposure areas is somewhat larger in dimension than the size of each of the pictures when taken and projected, as shown at 15, and each of these exposure areas is divided into color-divisions, as 16, 17, 16ª, 17ª and 18, 19, 18ª, 19ª, respectively. The exposure areas 11 and 12 with the color-divisions 16, 17, and 16ª, 17ª are preferably alike, and these exposure areas with the color-divisions are arranged in diametrically opposite parts of the circular body 10. The exposure areas 13 and 14 with the color-divisions 18, 19 and 18ª, 19ª may also be alike, and these exposure areas are also disposed in diametrically opposite parts of the body, but the latter exposure areas and color-divisions are disposed crosswise relatively to the exposure areas 11 and 12 as well as with the color-divisions 16, 17 and 16ª, 17ª. The color-divisions 16, 17 and 16ª, 17ª are preferably similar, being composed of red and violet, while the color-divisions 18, 19 and 18ª, 19ª are also similar being composed of yellow and green, though in instances more than two colors may be used in each of the exposure areas, and different primary colors may be used than those herein mentioned. The color-divisions of all of the exposure areas are preferably in the form of stripes disposed in adjacent relative positions radially with respect to the center of the body, as shown, and the stripes, or color-divisions of each exposure area may be of the same widths, or of different widths, for example the stripes, or color-divisions 16, 17 and 16ª, 17ª of each of the exposure areas 11 and 12 include a number of the wide color-divisions of red alternated with a like number of the color-divisions of violet each approximately of one-third the width of each of the red color-divisions while the stripes, or color divisions 18, 19 and 18ª, 19ª of each of the exposure areas 13 and 14 include a number of the wide color-divisions of green alternated with a like number of the color-divisions of yellow each substantially one-third the width of each of the green color-divisions.

The color-filter when employed for taking animated pictures of objects, scenery and the like is arranged on a camera between a sensitized film, or strip and the photographic lens of the camera, and the filter is caused to be intermittently revolved across the optical axis of the lens simultaneously with the exposures of parts of the strip when also intermittently transmitted across the optical axis of the lens so that each consecutive exposure of the strip will be affected by the color-divisions of each successive exposure area. The natural color-values will then be recorded on the negative which in turn is converted to a positive in the usual manner, and when the pictures are exhibited on a screen the color-filter is applied to a projecting apparatus so as to be interposed between the positive film, and a projecting lens. The color-filter is intermittently revolved across the optical axis of the lens synchronously with the intermittent transmission of the positive film also across the optical axis of the lens so that each successive picture will be affected by the color-divisions of each exposure area. When the pictures are projected the color-divisions of the exposure areas occupy positions relative thereto as they occupied when the pictures were photographed.

In the foregoing description I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope thereof.

Having thus described my invention, I claim as new and desire to secure by Letters Patent:—

A color filter of the class described comprising an opaque body having a plurality of equally spaced exposure areas disposed concentrically to the center thereof and slightly larger than the size of each picture area of the picture strip affected, each exposure area of the body being divided into color divisions in the form of adjacent alternating stripes of a plurality of different colors, the colors of the stripes of one exposure area being different than those of the stripes of the succeeding exposure area.

This specification signed and witnessed this 24th day of May A. D. 1916.

FREDERICK W. HOCHSTETTER.

Witnesses:
  GEORGE F. BENTLEY,
  C. SHIEGLEY.